United States Patent [19]

Witehira et al.

[11] Patent Number: 5,175,484
[45] Date of Patent: Dec. 29, 1992

[54] ELECTRICAL POWER DISTRIBUTION

[75] Inventors: Pita Witehira; Evan L. Bydder, both of Hamilton, New Zealand

[73] Assignee: Power Beat International, Ltd., Hamilton, New Zealand

[21] Appl. No.: 524,325

[22] Filed: May 16, 1990

Related U.S. Application Data

[63] Continuation-in-part of Ser. No. 487,730, Mar. 2, 1990, which is a continuation-in-part of Ser. No. 441,460, Nov. 27, 1990, which is a continuation of Ser. No. 248,715, Sep. 26, 1988, Pat. No. 4,883,728.

[30] Foreign Application Priority Data

May 17, 1989 [NZ] New Zealand .................. 229179

[51] Int. Cl.$^5$ ................................................ H02J 7/00
[52] U.S. Cl. ........................................ 320/6; 320/15; 307/10.6
[58] Field of Search ............... 320/6, 15; 307/10 R, 307/9

[56] References Cited

U.S. PATENT DOCUMENTS

| | | |
|---|---|---|
| 406,822 | 7/1889 | Dey . |
| 1,522,613 | 1/1925 | Cole . |
| 1,924,959 | 8/1933 | Patterson, Jr. ................ 320/7 |
| 2,044,917 | 6/1936 | Richardson ................ 320/6 X |
| 2,085,275 | 6/1937 | Schmidt ........................ 320/6 |

(List continued on next page.)

FOREIGN PATENT DOCUMENTS

| | | |
|---|---|---|
| 3044830 | 7/1982 | Fed. Rep. of Germany . |
| 368454 | 7/1906 | France . |
| 1246427 | 12/1959 | France . |
| 1270691 | 7/1960 | France . |
| 2192386 | 2/1974 | France . |
| 59-83350 | 5/1984 | Japan . |
| 525374 | 8/1940 | United Kingdom . |
| 2085645 | 4/1982 | United Kingdom . |
| 86/00759 | 1/1986 | World Int. Prop. O. . |

OTHER PUBLICATIONS

Chemical Abstracts of Japan, vol. 108:59455d.
Patent Abstracts of Japan, vol. 9, No. 318 (E-366) [2041] Dec. 13, 1985.
Patent Abstracts of Japan, vol. 11, No. 4 (E-468) [2451] Jan. 7, 1981.
Patent Abstracts of Japan, vol. 11, No. 309 (E-547) [2756] Oct. 8, 1987.

*Primary Examiner*—R. J. Hickey
*Attorney, Agent, or Firm*—Knobbe, Martens, Olson & Bear

[57] ABSTRACT

The present invention relates to power distribution systems and more particularly, to such systems using power storage devices such as batteries and involving a first electrical load best served by a power source having a low current rate and slow discharge period, and a second electrical load best served by a power source having a high current rate and rapid discharge period. One particular application involving these requirements is in automobile electrical systems. The present invention provides an electrical control circuit that functions in conjunction with such power sources to satisfy such electrical system operating requirements. The system of the present invention maintains the power sources in electrically separate condition when the associated vehicle engine is not running, so as to prevent discharge of the power source serving engine starting systems as a result of inadvertent discharge of the other power source. The control circuit detects presence of external conditions such as vibration or voltage drop created as an operator is about to start the engine. The control circuit electrically connects the power sources for starting, and may retain the connection for charging purposes, but disconnects the power sources from each other after engine operation is concluded. Controls are also provided for connection or disconnection of the power source in response to detected conditions such as undesirable voltages or current flows in the electrical system.

38 Claims, 7 Drawing Sheets

U.S. PATENT DOCUMENTS

| | | | |
|---|---|---|---|
| 2,629,059 | 2/1953 | Baumheckel . | |
| 2,831,910 | 4/1958 | Bates . | |
| 3,029,301 | 4/1962 | Strider | 320/7 |
| 3,242,009 | 3/1966 | Schilke . | |
| 3,314,822 | 4/1967 | Jost . | |
| 3,434,883 | 3/1969 | Babusci et al. . | |
| 3,475,221 | 10/1969 | Jordan et al. . | |
| 3,556,853 | 6/1969 | Cannone . | |
| 3,673,415 | 10/1973 | Ownby | 320/6 |
| 3,758,345 | 9/1973 | Toth . | |
| 3,763,397 | 10/1973 | Yockers | 307/9 X |
| 3,829,753 | 8/1974 | Marshall | 320/6 |
| 3,883,368 | 5/1975 | Kordesch et al. . | |
| 3,973,991 | 8/1976 | Cestaro et al. . | |
| 4,051,304 | 9/1977 | Snook . | |
| 4,082,992 | 4/1978 | Day | 320/6 |
| 4,151,331 | 4/1979 | Hug et al. . | |
| 4,173,066 | 11/1979 | Kinsman . | |
| 4,204,036 | 5/1980 | Cohen et al. . | |
| 4,283,844 | 8/1981 | Milden et al. . | |
| 4,473,623 | 9/1984 | Ishikura et al. . | |
| 4,546,053 | 10/1985 | Sundberg . | |
| 4,684,580 | 8/1987 | Cramer . | |
| 4,733,100 | 3/1988 | Nusairat et al. | 307/9 X |
| 4,757,249 | 7/1988 | Farber et al. | 320/15 |
| 4,761,352 | 8/1988 | Bakos et al. . | |
| 4,769,299 | 9/1988 | Nelson . | |
| 4,770,954 | 9/1988 | Noordenbos . | |
| 4,883,728 | 11/1989 | Witehira | 429/160 |

ELECTRICAL POWER DISTRIBUTION

CROSS REFERENCE TO RELATED APPLICATIONS

This application is a continuation-in-part of U.S. application Ser. No. 487,730, filed Mar. 2, 1990, which is a continuation-in-part of U.S. application Ser. No. 441,460, filed Nov. 27, 1989, which is a continuation of U.S. application Ser. No. 248,715, filed Sep. 26, 1988, now U.S. Pat. No. 4,883,728.

BACKGROUND OF THE INVENTION

The present invention relates to electrical power distribution systems. It has particular but not sole application to automotive starting, lighting and ignition (SLI) systems, and power distribution thereto from automotive batteries, hereinafter referred to as SLI batteries.

The conventional automotive SLI Battery consists generally of six 2.2 volt Lead Acid cells connected in series. It is a primary function of the automotive battery and associated power distribution system to provide sufficient high electric current at short intervals to crank the internal combustion engine in order that it may start. The distribution system must also provide current to the coil in order to achieve engine ignition.

Another important function which must also be provided is that of reserve current to provide lighting and ignition for the vehicle if the vehicle's generator is not operating.

The electrical current requirements of the starter motor are vastly different form those of the vehicle's auxiliaries, such as lighting and ignition. On the one hand, cranking requires large amounts of current for a relatively short duration as the starter motor cranks the internal combustion engine against the compression of the cylinders. Ignition and other vehicle auxiliaries, however, require lower current rates but for long periods of time.

The conventional SLI battery and associated distribution system is therefore designed first to provide sufficient cranking power, and secondly to provide current to the vehicle's auxiliaries whilst the generator is not working. One other function is to act as a voltage load leveller as part of the vehicle's electrical circuits whilst the generator is operating.

It can be said that the conventional SLI battery is primarily a starting battery. However, as the automobile has become more electrically sophisticated, the need to cater to increased auxiliary power demands has placed extra demands on the SLI battery, resulting in the possibility of frequent accidental discharge through the auxiliary circuits.

Engine starting requires larger electrode plate surface areas to provide sufficient cranking capacity. SLI batteries contain cell structures having multiples of thin plates as opposed to thicker plates in order to provide sufficient high current discharge for cranking.

Space restrictions within a vehicle prohibit larger or thicker plates. Thinner electrode plates, whilst suitable for rapid discharge and recharge, are not compatible with longer, slower and deeper discharge cycles which result from auxiliary power use.

When thin plates are subjected to deep discharge as could happen by accidental discharge through auxiliary circuits they tend to buckle, or lose some active material. Positive plates used in conventional SLI constructions also utilize a paste mixture of active material which increases the ability of the plate to dump current (rapid discharge) but also limits the plate's abilities to recover from the effects of deep discharge.

Attempts to overcome these problems have been made by a number of people. Thus, U.S. Pat. No. 406,822 in the name of Dey shows a battery which is divided into two cell groups by an internal dividing plate. U.S. Pat. No. 1,924,959 in the name of Patterson shows four cells, two of which are in series and two of which can be configured either in parallel or series by the throwing of a switch. The cells are totally separate. U.S. Pat. No. 3,029,301 in the name of Strider shows a construction in which two battery parts are provided in series so that six and twelve volt voltage sources can be provided. U.S. Pat. No. 3,242,009 in the name of Schilke shows the construction in which two battery parts are provided, but these are used to provide a number of different voltages. U.S. Pat. No. 3,475,221 in the name of Jordan shows two separate batteries in one container.

U.S. Pat. No. 3,758,345 in the name of Toth shows a construction in which a small auxiliary battery is provided in a shaped recess formed in the main plate. U.S. Pat. No. 3,883,368 in the name of Kordesch shows a construction in which two or more current rates are provided by the use of different types of electrodes, and U.S. Pat. No. 4,684,580 in the name of Cramer shows a construction wherein the casing for the battery has a pocket or recess into which a second or auxiliary battery can be provided.

None of these patents show a construction wherein the problems of the large but short duration current required for cranking and the lower but longer duration demand required by the auxiliaries is able to be coped with in a single battery system configuration. U.S. Pat. No. 3,883,368 does disclose a battery which is able to cope with differing current rates, but this is only achieved by the use of different electrodes, and is not suitable for SLI applications. U.S. Pat. No. No. 4,684,580 in the name of Cramer could provide a construction in which different current draw offs are provided, but this is achieved only by the use of two quite separate and distinct batteries, one of which is able to be mounted on the other. Such double battery constructions require extensive changes to be made to the vehicle electrical architecture and are expensive to manufacture.

Some battery systems have been designed to overcome inconvenience to the vehicle user caused by accidental battery discharge. These include the placement of dual or multiple batteries in vehicles, thereby increasing available capacity. Double battery systems have also been developed. These double battery systems are based on the two-batteries-in-one concept whereby a main battery and a reserve battery are contained within a single structure, and a heavy switch and blocking diode system are incorporated between the main and the backup reserve battery. The blocking diode is used to prevent discharge of the backup reserve battery, while simultaneously providing charge current to that backup reserve battery. These batteries also require a switch between the two batteries, which switch must be capable of carrying the load required to crank the vehicle. Accordingly, the switch is heavy and requires manual operation to place the two batteries into electrical parallel. Such switch backup battery constructions are expensive to produce because of the heavy current diode and switching required. In recent times, batteries have been increasing in size to overcome the problem of accidental discharge. High cold cranking amp batteries using a large number of thin multiple electrode plates are being installed into vehicles to counter the effects of increasing auxiliary electrical power load requirements.

As electrode plates become thinner, the number of plates per cell can be increased. However, this does not adequately solve the problem and does in fact result in plates being too thin to withstand the pressures of deep discharge that become more and more common as the demands on auxiliary power in the car increase.

From the above, it can be appreciated that prior efforts have simply been unsuccessful in providing a practical power distribution system for use in automobile applications, for example, that satisfies the different cranking current and auxiliary current demands and which avoids loss of cranking current due to accidental battery discharge. A power sound and related electrical system for overcoming these problems has not been previously available.

It is therefore an object of the present invention to provide a power distribution system which will at least obviate or minimize the foregoing disadvantages.

Accordingly, the present invention overcomes the problem of the differing current demands placed on the same battery by the modern automobile. The present invention includes an electrical power distribution scheme which allows for discharge and recharge management of cells within the battery structure without requiring heavy duty switches or major electrical alterations to the electrical architecture. While it is possible to overcome the problem of variation in current requirements within an automobile by installation of two or more batteries, the cost to the consumer is a disadvantage, and space constraints in many automobiles make this impractical.

Accordingly, it is an objective of the present invention to provide a cost effective alternative for the consumer.

SUMMARY OF THE INVENTION

Accordingly, one aspect of the invention utilizes a battery including a container, one or more cells in the container, each said cell having therein at least one positive plate and at least one negative plate, at least some said plates comprising multiple layers of electrode material. One such battery configuration that can be used in the power distribution system of the present invention is disclosed in U.S. Pat. No. 4,883,728 to Witehira, which reference is hereby incorporated herein by reference. The batteries disclosed by Witehira provide at least two separate positive terminals or two separate negative terminals, with each separate terminal and its related terminal of opposing polarity comprising a power source. Alternatively, more than one separate battery may be used, with each such battery comprising a separate power source.

One embodiment of a battery disclosed in U.S. Pat. No. 4,883,728 and suitable for use in the system of the present invention is a battery comprising a single housing having a plurality of electrochemical cells therein, the plurality of cells including a first set of cells electrically connected in series to a first positive terminal cell and associated first positive terminal, a second set of cells electrically connected in series to a second positive terminal cell and associated second positive terminal, and a common negative terminal cell and associated terminal to which both the first and second sets of cells are connected in parallel, each such cell having a plurality of positive and negative electrode plates therein and an electrolyte in contact with the plates. In one preferred embodiment, the first set of cells has different discharge characteristics than the second set of cells. This can be accomplished, e.g., where the plates in the first set of cells are thicker than the plates in the second set of cells.

Preferably, at least some of the plates comprise active material of a density compatible with deep cycle abilities, that is to say, the active material is of a higher density than that used for plates designed for rapid discharge.

The electrical power distribution system of the present invention comprises a battery such as that described above, in an automobile having a cranking circuit and an auxiliary circuit, wherein the negative terminal of the battery is electrically connected to the chassis of the automobile as ground, the first positive terminal is electrically connected to the cranking circuit, and the second positive terminal is electrically connected to the auxiliary circuit, so that for at least one mode of operation of the auxiliary circuit, the second positive terminal is connected only to the auxiliary circuit and not to the cranking circuit. Also, there is preferably a switch for electrically connecting the first positive terminal to the auxiliary circuit. In one preferred embodiment, the switch is operable in response to depression of the accelerator of the automobile, or other indication that the vehicle is or will soon be started, such as vibration noise, opening of the vehicle door, or pressure on the driver's seat. Optionally, a current overload circuit breaking switch between the positive terminals is also provided.

In one embodiment, the circuit includes a starter relay for energizing the cranking circuit, and the circuit is adapted to supply the relay with current from both the first and second positive terminals. In a preferred embodiment, the electrical system includes an ignition switch, and the ignition switch includes a switch position that is adapted to provide a connection between the first and second positive terminals.

In a still further aspect, the invention provides an automobile electrical system comprising a battery with a first heavy current conductor cable connected to the battery negative terminal and earthed to said automobile, a second current conductor cable connected to one or more positive terminals of said battery and connected to a current first switch, said current switch being connected to the electric starter motor of said automobile, a third current conductor cable connected to one or more of the battery's positive terminals and to the auxiliary circuits of said automobile, a fourth current electrical conductor cable connected to one positive terminal not engaged by said second current connector cable, said fourth current conductor cable being in common circuit with the generator circuit line of said automobile, then to a second switch, a fifth current conductor cable from said second switch connected to said terminal engaged by said second current conductor cable.

In another preferred embodiment, the invention comprises an automobile electrical system including a battery with a negative terminal grounded to the automobile, and a first positive terminal that is connected to a series of cells which are capable of slower, deeper discharge and recharge as opposed to a second positive terminal, which is capable of rapid discharge and recharge. A low resistance, heavy current conductor cable is connected from the first terminal to a starter relay. When operated, the relay connects the heavy current conductor to the starter motor. A higher resistance, lighter conductor cable is connected from the first terminal to the vehicle's ignition and auxiliary circuits. A medium duty switch is connected via a pair of low resistance conductors between the first and second terminals. This switch is activated by an electrical circuit which is responsive to an indication that the vehicle is or will soon be started, such as vibration, or noise. The circuit causes the switch to close, connecting the first and second terminals together to provide current for cranking purposes, as well as to provide current for the auxiliary and ignition systems. The switch remains closed until after the vehicle is turned off, and after the vibration, noise or other source which influences the circuit has stopped for a specified period of time. The switch then opens, isolating the first and second terminals from each other, so that the second terminal is not discharged by continued supply of power through the high resistance conductor to the ignition and auxiliary systems.

In still another embodiment, the invention comprises a battery such as that described above, wherein a high resistance, low current cable connects the first, slow, deep discharge terminal to the auxiliary and ignition systems. A low resistance, high current conductor is connected from the rapid discharge terminal of the battery to the starter relay, and then to the starter motor upon closing of the starter relay. A switch is connected between the high resistance and low resistance conductors, and is responsive to an electrical circuit for tying those two conductors together upon sensing that the vehicle is or will soon be started, by detecting conditions such as vibration, or noise. The electronic circuit for detecting the vibration or other external indication continues to maintain the switch in a closed position until after the engine has been turned off, and, preferably, after the operator has left the vehicle. Upon expiration of a predetermined time, the circuit causes the switch to open, so as to segregate the first and second terminals.

In another preferred embodiment, the circuit for closing the switch between the high and low resistance conductors is sensitive to a drop in voltage produced on the high resistance cable serving the auxiliary circuits, the voltage drop is produced by a condition such as the ignition switch being turned to the start position. In response to this voltage drop, the switch between the high and low resistance conductors is closed, tieing the first and second terminals of the battery together for a period of time to permit cranking of the engine. After a predetermined period of time, the switch is again opened and remains open until another voltage or current detection indicates that the electrical system is in condition for charging of both power sources through the first and second terminals. At that point, the switch is again closed and remains closed until charging is completed, or until the engine is turned off. The sensing portion of this switch can also be sensitive to physical conditions as opposed to a voltage drop, such as vibration, tilt, acceleration or any other motion of the vehicle resulting from a driver getting into it or shutting the door, or moving within the vehicle. In this embodiment, the circuit would continue to use the sensor for detecting when charging of both terminals can commence.

An important feature of any or all of the above preferred embodiments is a circuit that isolates the first and second terminals of the battery when the second (rapid discharge) terminal is drawing a significant current, e.g. more than 20 amps, from the first (slower, deep discharge) terminal, such as during cranking of the engine by the starter motor when the first terminal battery which is connected to the auxiliary circuits has not been discharged. The operation of this circuit ensures that the voltage supplied to the auxiliaries via terminal one is not reduced by the electrical load presented to the second terminal as a result of operating the starter motor (or equivalent high current demand circuit). This feature, which may be incorporated in the circuit, or by means of a separate electrical circuit breaker (self-resetting), ensures easier starting and optimum power supply to all auxiliaries, such as the ignition system and engine management computer system, during the engine starting process.

The circuit configurations described above can be responsive to a sensor positioned at a location on the vehicle, or on the engine itself. Alternatively, the circuit and sensor can be stored within the housing of the battery itself, so as to permit ease in battery installation, with minimal change to the vehicle or its electrical system.

The present invention also can use a Lead-Acid Battery comprising a container having a plurality of cells including positive and negative terminal cells, each cell containing a plurality of alternating positive and negative electrode plates separated by means of a separator and constituting a cell element stack. Each of the plates is comprised of a grid having active material pasted thereon. The positive electrode plates of the cells are connected electrically. Similarly, the negative electrode plates of the cells are connected electrically. The electrode plates of each cell are electrically connected in series parallel. That is, a number of cells are connected in series, parallel to another like number of cells also connected in series but sharing the same negative electrical connection at the negative terminal.

Half of the cells preferably contain thicker positive electrode plates made up by layers of thinner plates, whilst the other half have thinner positive electrode plates. All negative electrode plates may be of the same thinner size.

This invention therefore provides for a battery having two sets of cells arranged in series parallel, thus providing dual or multi current variations at the positive terminals. That series of cells having the thinner positive plates provide high current from the connected positive terminal for short durations. The other series of cells, having thicker layered positive plates, have less plates per volume space, however the current capacity is equal to the cells having thinner plates, during longer slower discharges of the battery. The mass of the active material in the thicker plates is preferably greater than that of the corresponding material in the thinner plates.

The present invention therefore provides the vehicle manufacturers and owner with a dual or multi current power supply system that for cranking purposes will provide high current flows through the cells having thin positive plates with this high current available for shorter durations. A lower but longer current flow is also available from the cells having thicker layered positive plates. Both sets of cells can be connected electrically for cranking purposes while, optionally, only the cells having the thicker layered plates can be connected electrically to the automobile's auxiliary circuits, thus providing for slower and longer discharge periods.

During recharging of the cells, all cells are connected electrically and thus the reverse cycle is occurring as in a conventional Lead Acid Battery. This is made possible because all cells share a common negative terminal to earth. The circuits that control electrical connection and separation of the two power sources function without operator intervention, thus providing for increased ease in operation. The ability to package the electrical control system in the housing significantly increases the versatility of the system, which can then be installed in the vehicle with very little change to the vehicle or its wiring system.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

In the following more detailed description of the invention, reference will be made to the accompanying drawings in which.

DETAILED DESCRIPTION OF THE PREFERRED EMBODIMENT

While the invention will be described in connection with preferred embodiments, it will be understood that the invention is not intended to be limited to the preferred embodiments. On the contrary, all alternatives, modifications and equivalents as may be included within the spirit and scope of the present invention are intended to be covered in the appended claims. Thus, while the present invention will be described in conjunction with an SLI Automobile Battery, it should be appreciated that the invention is equally applicable to any other Lead-Acid Battery application.

Use of the present invention will be particularly advantageous in applications which require both the ability to provide high cranking power and the ability to provide a longer and slower power draw off from a pair of power sources and preferably, where the power sources are separated terminals of a battery encased within one casing and having dimensions equivalent to conventional SLI batteries.

The present invention therefore sets out to overcome the problem of longer, slower discharges in feeding an automobile auxiliary system, for example, using up the available high discharge capacity required for cranking operations.

The present invention minimizes loss of cranking capacity through use of a slow discharge power source that is electrically separate from a fast discharge power source so that, by electrical switching, it is possible to obtain full use of all active material within the power source for usual day to day use as, for example, a conventional SLI battery. By electrical circuit design, it is also possible to isolate that section of the battery characterized by plate design that is best suited for slower and longer current draw off than cranking requires. By switch or circuit design, the present invention also prevents depletion of the cranking capacity by the auxiliary circuits within an automobile.

DETAILED DESCRIPTION OF THE INVENTION

Figure 1:
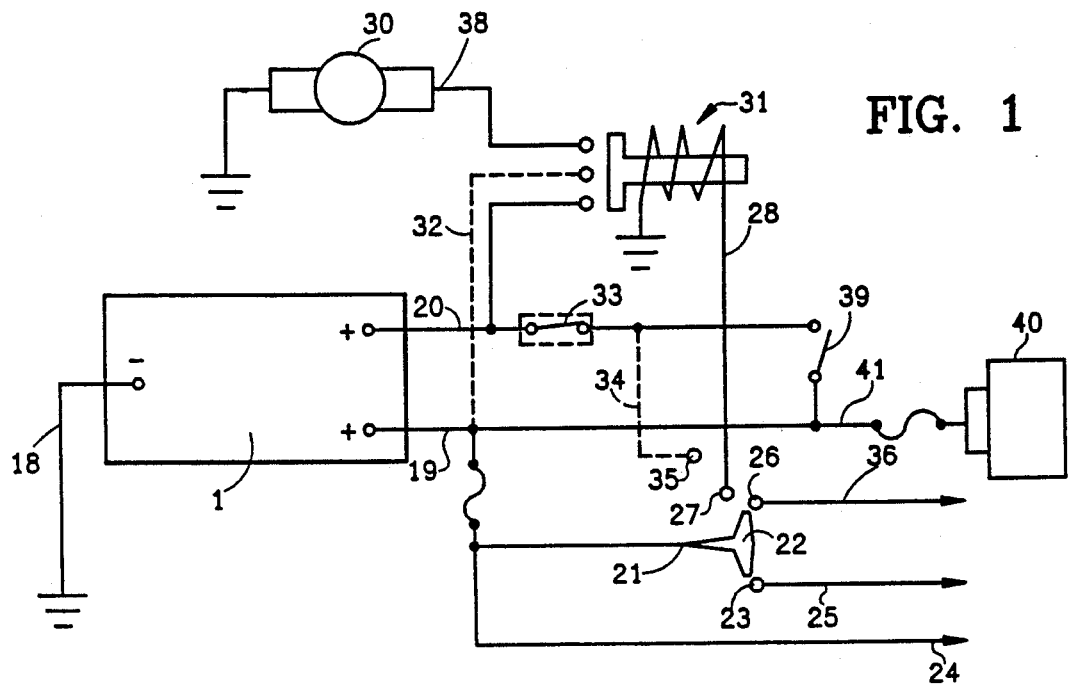
FIG. 1 is an electrical schematic diagram of one presently preferred embodiment of the power distribution system of the present invention.

Turning now to a more detailed description of the present invention, reference is first made to FIG. 1, which refers to a battery 1 of the type described in U.S. Pat. No. 4,883,728. Of course, other battery configurations could be substituted without departing from the spirit or essential characteristics of the invention.

The battery is earthed or grounded through earth connector 18. The battery provides two positive leads 19 and 20. Positive lead 19 is applied to the common terminal 21 of ignition switch 22. The ignition switch 22 may provide a spare terminal 23 which can be contacted by, for example, a reverse turn of the key from which extends electrical conductor 25 which may be used, for example, to allow a radio to play while the key is out. That is to say it can provide an electrical connection when the key is in an unlocked position.

Lead 36 extending from terminal 26 is utilized for the auxiliaries and ignition circuits of the motor vehicle in which the battery is to be used. The generator is connected directly to lead 19. Terminal 27 provides current through lead 28 to the solenoid 31 which is then activated to provide current to the starter motor 30 through lead 38. Lead 32 is an optional and further high current lead from the second positive terminal. If this lead is provided, it effectively connects the two parts of the battery in parallel, thereby providing additional current capacity to the starter motor 30. When lead 32 is not provided, a terminal cut-off switch 33 is desirably provided.

A solenoid switch can be provided in lead 34 which extends between a further terminal 35 in the ignition switch 22 and the positive lead 20. A generator, alternator or similar charging source 40 is connected via a lead 41 to the battery terminal that serves the auxiliary circuits. A trip switch 39 may be provided which is able to be operated by, for example, movement of the accelerator of the vehicle, the oil pressure switch, the voltage regulator, or some other item with the desired item being the accelerator so that the switch becomes closed as the accelerator is pressed. Switch 39 electrically connects the charging source 40 to the battery terminal serving the starter motor 30, and must be provided to allow for recharging of the battery in use, eliminating the need for a diode in the circuit. Lead 24 is the general accessory lead which supplies current to vehicle accessories independent of the ignition switch.

Figure 2:
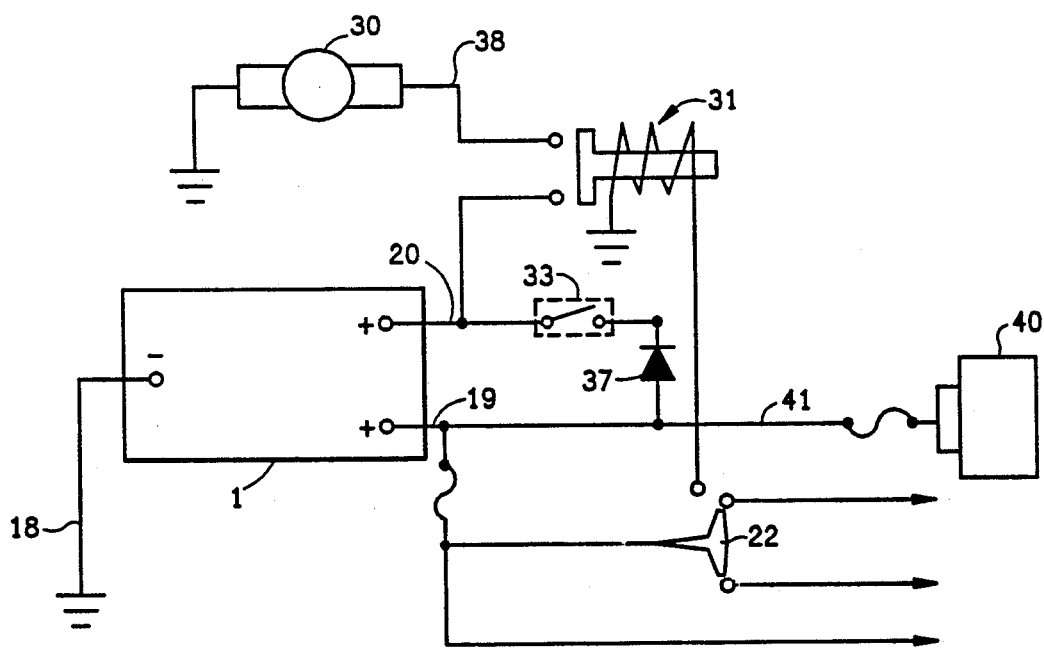
FIG. 2 is an electrical schematic diagram of another preferred embodiment of the power distribution system of the present invention.

FIG. 2 shows the construction of the battery 1 being provided in substantially the same manner along with ignition switch 22 and positive leads 19 and 20. Between the positive leads 19 and 20 is connected a diode 37 which allows for recharging of the two parts of the battery during standard use in substantially the known manner and without the need to provide switch 36 or lead 32 of FIG. 1.

Figure 3:
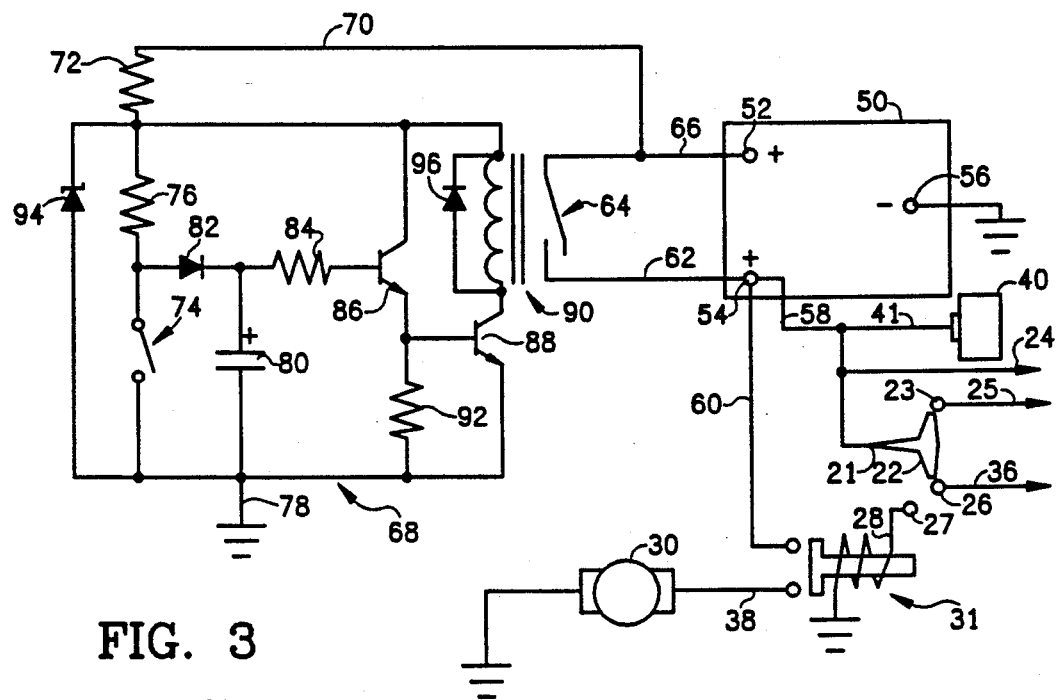
FIG. 3 is an electrical schematic diagram of still another preferred embodiment of the power distribution system of the present invention.

Referring now to FIG. 3, a battery 50 is illustrated as being constructed in substantially the same manner as the battery 1 described above. In particular, it is noted that battery 50 has two positive terminals 52 and 54, respectively, and a grounded negative terminal 56. However, one skilled in the technology will recognize that this and the other systems described herein could also properly operate through use of two separate batteries, each having positive and negative terminals. Furthermore, the power distribution system of FIG. 3 is configured such that all positive electrical connections from the battery 50 to the various loads can be made through conductors connected to a single terminal. Accordingly, the distribution system of FIG. 3 could employ a power source having a single positive terminal, such as a conventional automotive battery.

The battery 50 is preferably constructed such that typically half of the cells in the battery consist of electrode plate structures capable of multiple deep discharge and recharge cycles, while the remaining half of the cells consist of electrode plate structures and conductor connections capable of rapid discharge.

Terminal 56 is connected to the negative terminal cell of the battery and is a low electrical resistance terminal, which is connected to a grounded location such as on the vehicle frame. Terminal 54 is a positive terminal that is preferable connected to that series of cells which are capable of deep discharge, while terminal 52 is a positive terminal which is preferably connected to those cells that are capable of rapid discharge.

An electrical conductor cable 58, having a resistance typical of those conductor cables used in automobiles to conduct current from the battery to the vehicle's auxiliary system, is connected between the terminal 54 and the auxiliary systems and common terminal 21 of the ignition switch 22, in substantially the same manner as the embodiment illustrated in FIG. 1.

A low resistance electrical conductor cable 60 is connected at one end to the positive terminal 54, so as to provide current therethrough to the solenoid 31, which, when activated, provides current to the starter motor 30 through lead 38. Conductor 60 has a resistance typical of those conductors used in automobile electrical systems for conducting current from the battery to the vehicle's starter motor.

Positive terminal 54 is also connected via a low resistance electrical conductor cable 62 to a terminal of a switch 64. The switch 64 is also connected at another terminal, via another low resistance electrical conductor cable 66 to the positive terminal 52. In operation, switch 64 is normally open when the vehicle is not operating, but is closed to connect positive terminals 52 and 54 during vehicle operation. With medium duty switch 64 closed, the low resistance conductors are capable of carrying up to 600 amps of current between the positive terminals 52 and 54.

Operation of switch 64 is accomplished by means of a switch control circuit generally indicated at 68. In particular, the switch control circuit 68 operates to bring medium duty switch 64 into the closed position before engagement of the vehicle's starter motor, and to permit return of switch 64 to the open position at some time after engagement of the vehicle's starter motor. The closing of switch 64 prior to starter motor engagement, and opening thereof after such engagement, allows for the switch 64 to be of medium capacity as opposed to the heavy capacity conventionally used to activate the starter motor. More specifically, because switch 64 is not used to activate or break the current to the starter motor, pressure at the contact points of switch 64 can be lower than the contact points of the starter solenoid switch 31, and yet the contact points of switch 64 are equivalent to the conductivity capacity of the solenoid switch.

Power to drive the switch control circuit 68 is provided thereto via a line 70 from positive terminal 52 and through a resistor 72 which, in one preferred embodiment has a resistance of 22 ohms. A switch generally indicated at 74 comprises a movement sensor, vibrator, trembler or similar type of switch which, in the illustrated embodiment, is normally closed. In one preferred embodiment, the switch 74 comprises a vibrator switch vibration detector identified as a "Safe House" TM model, catalog number 49521, which is available in the United States from Radio Shack stores. When switch 74 is in the closed position, current travels from line 70 through the resistor 72 and a 14k ohm resistor 76, through switch 74 to a ground 78.

When switch 74 opens for a short period of time, such as when the vehicle moves as a result of someone opening the door, a 16 volt, 47 $\mu$F capacitor is charged via resistors 72 and 76, through a diode 82. Current from the capacitor 80 flows through a 330k ohm resistor 84 to the base of a transistor 86. Because of the presence of the resistor 84, current from the capacitor 11 flows for an extended time, which may typically be 30 seconds for appropriately chosen values of the capacitor 80 and resistor 84.

The current flowing into the base of the transistor 86 causes a much larger current to flow from the emitter of transistor 86 into the base of a transistor 88. This current is amplified by transistor 88 so that a current sufficient to operate a relay generally indicated at 90 is carried through the transistor 88, operating as a switch.

A 15k ohm resistor 92 is used to hold the base voltage of the transistor 88 at zero potential when that transistor is off, thereby enhancing its breakdown voltage as against spike voltages. The resistor 72 and an 18 volt zener diode 94 define one form of spike protection that may be used to protect the transistors 86 and 88. Alternatively, the zener diode may be replaced by a metal oxide varistor or capacitor. A diode 96 connected in parallel with the relay 90 is used to bypass reverse voltages generated by the coil of relay 90, when the transistor 88 stops conducting, thereby protecting the transistor 88.

In operation, the switch control circuit 68 will respond to an outside stimulus such as a vibration of the car upon entry of the operator, and will accordingly close the switch 64, connecting the terminals 52 and 54. Continued movement in the vehicle will continue to hold switch 74 in the open state, thereby causing the switch control circuit to continue to hold medium duty switch 64 in the closed position. Upon cessation of external stimuli, such as after the departure of the operator, the switch control circuit 68 will maintain the switch 64 in the closed position until expiration of the time delay period created by the flow of current from the capacitor 80 through the resistor 84. At that time, the switch 64 will be allowed to open, thereby separating the terminals 52 and 54, so that any continued auxiliary circuit operation (such as lights left on accidentally) will drain power only from the slow discharge positive terminal 54 of the battery 50, while maintaining the rapid discharge portion of the battery 50 fully charged, for later use in providing starting power to the vehicle.

It should also be noted that, although the Figures illustrate connection of the auxiliary circuits only to the slow discharge portion of the battery 50, it would be acceptable to provide for some very low current connections to be made to the rapid discharge terminal 52, for devices in the vehicle which may use less than approximately 15 milliamps of current. This provision is particularly valuable for low current devices such as clock and memory circuits, which may lose their stored information upon accidental loss of charge on the slow discharge side of the battery. By connection of those low current devices to the rapid discharge portion, substantially insignificant amounts of power are drawn from that power source and yet those devices may be maintained separate from the potential loss of information due to discharge of the slow discharge portion of the battery 50.

Of course, it will also be recognized that the switch control circuit 68 comprises merely one of numerous embodiments of a circuit that can control the switch 64 in response to detection of selected conditions.

Figure 4:
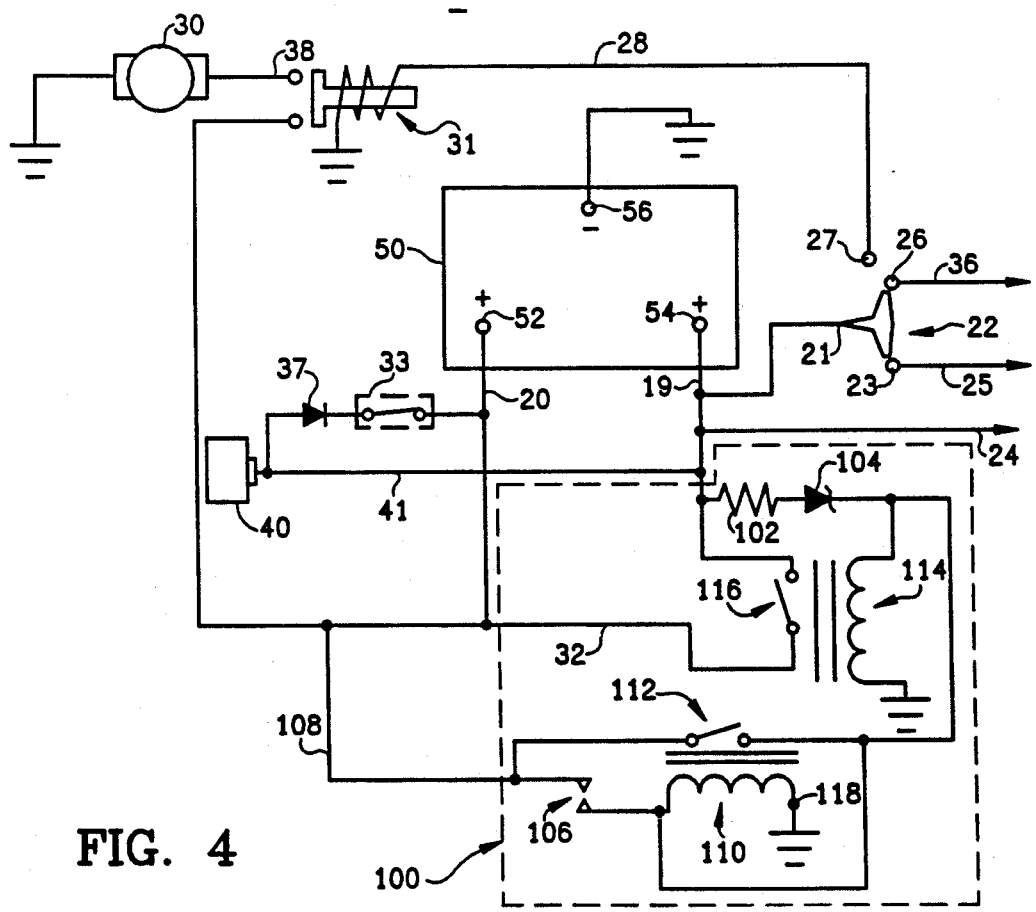
FIG. 4 is an electrical schematic diagram of still another preferred embodiment of the power distribution system of the present invention.

Referring now to FIG. 4, a power distribution system is illustrated which includes a battery 50, of the type previously described with respect to FIGS. 1-3. The configuration of the distribution system substantially corresponds to the system of FIG. 1, with the exception that the optional lead 32 is replaced by a switch system generally located at 100, which is electrically connected between positive leads 19 and 20, so as to connect those leads in response to detection of selected conditions. In addition, for purposes of illustration, the trip switch 39 of FIG. 1 has been replaced by the diode 37 of FIG. 2, to demonstrate interchangeability of these types of recharging controls. Of course, other methods for controlling the recharging of the rapid discharge portion of battery 50, via terminal 52 will be appreciated by those skilled in the technology.

Referring specifically to the switch system 100, the illustrated embodiment comprises a vibration sensitive switching system for interconnecting the terminal leads 19 and 20 upon detection of a vibration, and prior to cranking of the starter motor 30. Thus, the rapid and slow discharge terminals of the battery can be connected together to provide initial cranking current. The leads continue to be tied together during vehicle operation, to permit recharging of the battery and to provide power to the auxiliary systems. The switch system 100 will continue to maintain the tie between leads 19 and 20 until the monitored condition no longer exists, which would indicate vehicle operation has ceased. Following this, the leads are again separated to prevent discharge of the rapid discharge portion of the battery, by auxiliary load demands. Of course, the illustrated switch system 100 comprises only one embodiment of a system which could be sensitive to any of numerous conditions such as vibration, motion, tilt, acceleration or any other condition that would result from a person entering or leaving the vehicle.

In order to maintain a sufficient voltage level to the auxiliary circuits during cranking, lead 19 is a high resistance line of the type typically used for supplying auxiliary circuits in automobiles. On the other hand, lead 20 is a low resistance circuit designed for carrying a high amount of current, of the type typically used in automobiles for supplying power to cranking circuits. With this type of a relationship, the relative resistances of the leads 19 and 20 are such that during cranking, the voltage at terminal 52 may be drawn down from approximately 13.1 volts to approximately 8 volts, while the voltage at terminal 54 is drawn from 13.1 volts only to about 12 volts. This voltage drop at terminal 54 is acceptable for maintaining continued operation and integrity of computer circuits and the like which are typically included in the auxiliary circuit portion of the automobile electronics configuration.

In operation, the switch system 100 includes a resistor 102 and diode 104 connected in series with the lead 19, so as to permit a small amount of current to flow from lead 19 through those components in order to maintain power to the circuit. The current flowing through resistor 102 and diode 104 is not sufficient to cause the closing of any switches. A sensor device 106 comprises, for example, a vibrator switch such as a "Safe House" ™ model vibration detector identified as catalog number 49521 from Radio Shack in the United States. Sensor device 106 detects vibration caused by conditions such as an operator entering the vehicle. Upon detection of vibration, current is communicated from lead 20 via a line 108, through the contacts of the sensor 106 to a relay coil 110. The relay coil acts in response to the receipt of current to close a low current switch 112, thereby permitting current to flow from the terminal 52 via lead 20 and line 108, across the switch 112 to another coil 114 on a high current relay. Upon receiving current therein, coil 114 acts to close a normally open switch 116, completing a connection between leads 19 and 20. Switch 116 will remain closed until after vibration detection has ceased, at which time the current flow through sensor 106 to the coil 110 will cease, opening switch 112, which will then cause the opening of switch 116.

The resistor 102 and diode 104 combination prevents overloading of the switch system, by permitting the through flow of current when the voltage across coil 114 exceeds 13.1 volts. Operation of the switch system 100 can also be terminated by means of a timer 118 associated with the coil 110. The timer can be a heat sensitive device, which would prevent the flow of current through coil 110 under certain thermal conditions. Alternatively, sensor 106 can switch through a normal 555 timer circuit, which is not heat sensitive, and which would produce a timeout signal preventing current flow through the coil 110 at a predetermined time following cessation of the sensing of vibration. In this way, connection between the leads 19 and 20 is achieved prior to operation of the starter motor, with the connection being maintained until after the engine operation has ceased. Under these circumstances, the switch 116 can comprise a medium duty switch that is sufficiently small to permit its packaging and operation within the housing of the battery 50.

Figure 5:
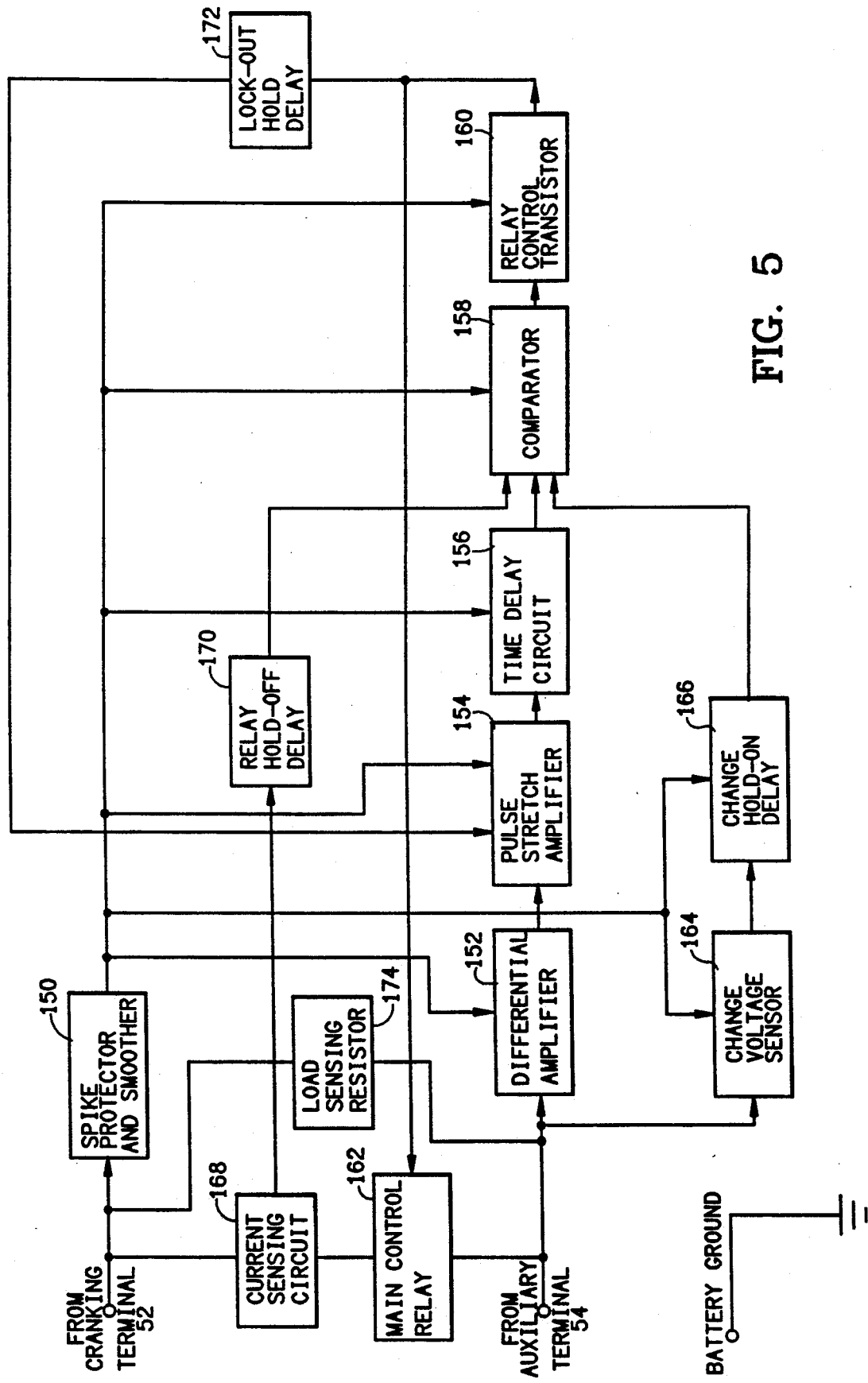
FIG. 5 is a block diagram of a control circuit for operating the switch between the positive battery terminals of the system illustrated in FIG. 4.

FIG. 5 illustrates a block diagram of another control circuit that can be interposed between leads 19 and 20 in the circuit of FIG. 4, replacing, for example, the switch system 100 of FIG. 4. In particular, the control circuit of FIG. 5 is one which functions in response to detected electrical conditions within the system, as opposed to the mechanical conditions such as vibration, discussed in connection with the circuits of FIGS. 3 and 4. Nevertheless, the circuit accomplishes the same purposes, in that it detects a condition such as the turning on of the engine ignition key, that occurs prior to cranking of the starter motor. In response to detection of the selected condition, the circuit responds in the manner described with respect to the circuits of FIGS. 3 and 4, and electrically connects the terminals 52 and 54 of the battery 50. The circuit also provides for detection of voltage or current levels within the power distribution system that are outside of acceptable limits, and responds by electrically connecting or separating the terminals 52 and 54 of the battery as appropriate. For example, if current drawn to the starter motor during cranking is causing the voltage to the auxiliaries to drop below acceptable levels, the circuit of FIG. 5 will disconnect the terminals 52 and 54, thereby allowing the auxiliaries to be fed from a power source which is electrically separated from the cranking starter so that its voltage level is not influenced by the starter system. Likewise, after cranking, with the engine running and the alternator being capable of charging both portions of the battery 50, the circuit detects this situation and provides for connection of the terminals 52 and 54 to allow charging of both battery cell structures. The circuit of FIG. 5 also provides for time delay operation in the separation of terminals 52 and 54 after engine operation has ended.

This circuit can best be understood by reference to the individual components of FIG. 5. Power to operate the circuit of FIG. 5 is supplied from the cranking terminal 52, and is smoothed and protected from spikes by means of a spike protector and smoother circuit illustrated in block 150. When the electrical load is increased on the battery serving the auxiliaries through auxiliary terminal 54, such as when the ignition switch is turned to the "bias" position, the battery voltage drops, and a small negative-going pulse is developed. This pulse is amplified and inverted in a differentiating (high pass) amplifier circuit 152, and is then passed to a pulse stretch amplifier 154 which has positive AC feedback. As the stages in the circuit are AC coupled, they can only respond to reasonably rapidly varying voltages. Thus, the pulse stretch amplifier 154 amplifies and stretches the signal so as to be large and long enough to operate a time delay circuit 156, producing a voltage output that is held for about 30 seconds. That voltage output is converted into a two level switching voltage by a comparator 158 which provides additional power to the base of a relay control transistor 160. This causes an increase of current flow through that transistor, and thereby energizes a main control relay 162, causing that relay to close the switch between the terminals 52 and 54. The result is, that a load increase on the auxiliary terminal 54 causes the main control relay 162 to close for a time period of about 30 seconds, subject to control by other parts of the circuit.

After cranking of the starter motor is completed, and during normal engine operation, charging of the auxiliary portion of the battery is accomplished through terminal 54, by means of an alternator 40 (FIG. 4). In FIG. 4, diode 37 and thermal cutoff switch 33 are provided to permit charging of the cranking side of the battery via terminal 52. However, for purposes of discussion with respect to FIGS. 5-8, it will be assumed that the diode 37 and thermal cutoff switch 33 are not included in that circuit.

During the engine operation, if the charging voltage applied to auxiliary terminal 54 exceeds a preset voltage limit such as 13.6 volts, a change voltage sensor 164 will detect that voltage change, and will generate an output voltage which is communicated to a change hold-on delay circuit 166. The delay circuit 166 provides an output signal that is "held on" for about 10 seconds. This hold signal is fed from circuit 166 into comparator 158 from whence it is transmitted to the relay control transistor 160 for operating the main control relay 162 so as to close the switch 116 between terminals 52 and 54 and for at least the period of the "hold-on" signal, thereby allowing charging of both sides of the battery.

The purpose for the change hold-on delay circuit 166 is more readily apparent when one understands that if the voltage at the cranking terminal 52 is low prior to closing the relay 162, then closing that main control relay 162 so as to close switch 116, would possibly cause the voltage at the auxiliary terminal 54 to drop well below the 13.6 volt level discussed above. This would cause the circuit to operate as described above in response to a low voltage detection on terminal 52, opening the main control relay 162 and the switch 116. This would thereby prevent charging of the cranking portion of the battery through terminal 52. However, this problem is resolved by use of the change hold-on delay circuit 166 which functions to hold the main control relay 162 closed for approximately 10 seconds. This cycle will repeat when the main control relay 162 opens, subject to over-ride by other parts of the circuit.

If, as during engine cranking, voltage at the cranking terminal 5 falls significant below the voltage at the auxiliary terminal 54, current will be drawn from the auxiliary terminal 54 into the cranking terminal 52, lowering the voltage at the auxiliary terminal 54. Such flow of current from the terminal 54 to the terminal 52 is sensed by a current sensing circuit 168, which then operates a relay hold-off delay circuit 170, to over-ride other parts of the circuit by feeding a voltage into the comparator 158 that will cause the main control relay 162 to stay open for 10 seconds. If appropriate, this cycle will repeat.

The lockout hold delay circuit 172 is provided to insure that when the main control relay 162 opens and disconnects terminals 52 and 54, that any pulses or voltage drops generated thereby cannot cause the circuit to recycle, by preventing the pulse stretch amplifier 154 from passing or amplifying any signals for a period of one second after the main control relay 162 opens.

The load sensing resistor 174 is provided to supply a bleed current of around 5 milliamps to the auxiliary terminal 54, from the cranking terminal 52. This is done so that even if the battery connected at the auxiliary terminal 54 is completely discharged, current and voltage are made available to allow a load increase at the auxiliary terminal 54 to still cause a small but adequate negative pulse to be generated and transmitted to the differential amplifier 162, to operate the circuit.

Figure 6:
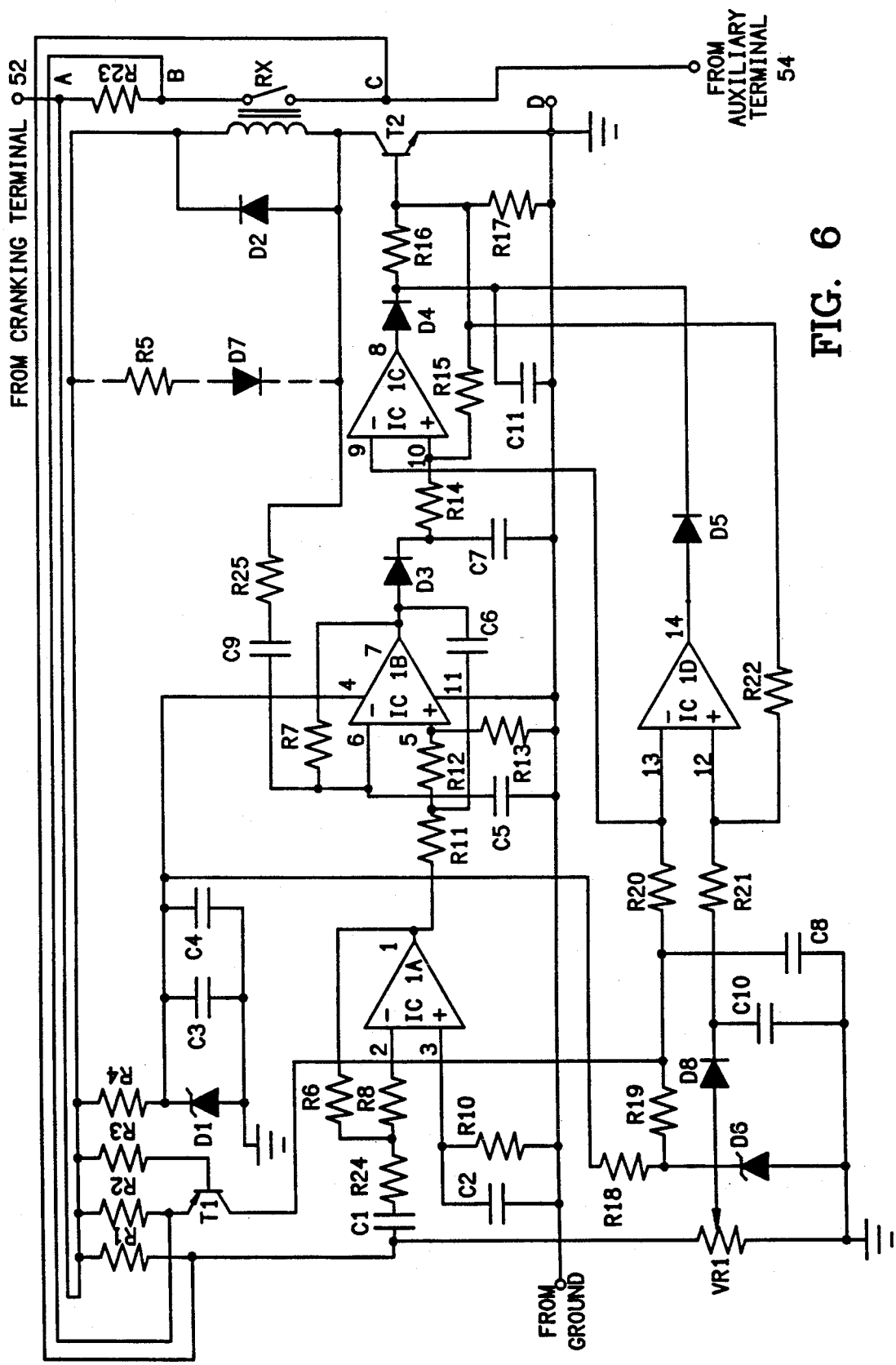
FIG. 6 is a detailed electrical schematic diagram of the control circuit of FIG. 5.

One presently preferred embodiment of a circuit that corresponds both in configuration and operation to the circuit of FIG. 5 is illustrated in FIG. 6. The correspondence between the circuit blocks defined in FIG. 5 and the elements of the circuit of FIG. 6 can best be understood by reference to Table 1 below. It is noted that the letters representing the components generally designate the type of device as follows: R is a resistor; C is a capacitor; D is a diode; T is a transistor; RX is a relay; VR is a variable resistor or potentiometer; and IC is an amplifier.

TABLE 1

| COMPONENTS OF THE CIRCUIT OF FIG. 5 | CORRESPONDING COMPONENTS IN THE CIRCUIT OF FIG. 6 |
|---|---|
| Spike protector and smoother 150 | R4, D1, C3 and C4 |
| Relay hold-off delay 170 | C8, R19, IC1D |
| Current sensing circuit 168 | R23, T1, R2, R3 |
| Main control relay 162 | RX |
| Differential amplifier 152 | C1, R24, R6, C2, R10, IC1A |
| Pulse stretch amplifier 154 | R12, R13, R7, C6, IC1B |
| Time delay hold-on circuit 156 | D3, C7, R14, R15, IC1C |
| Comparator 158 | R18, D6, R14, R15, R17, T2, R16, IC1C |
| Relay control transistor 160 | T2 (plus D2 protection) |
| Change voltage sensor 164 | VR1, R18, D6, C10, IC1D |
| Change hold-on delay 166 | D8, C10, R21, R22, R16, D5 and IC1D |
| Lock-out hold delay 172 | T2, R25, C9 and IC1B |
| Load sensing resistor 174 | R1 |

It is noted that elements R5 and D7 in the circuit of FIG. 6 are optional, and are primarily used for indicating operation of the circuit. It is also noted that the amplifiers IC1A-IC1D are designated as CA324. All resistors except R23 are ¼ WATT resistors. R23 is formed of 60 millimeters of 1.5 millimeter diameter resistance wire to get 0.02 ohms with 50 amp current capacity. Furthermore, the component VR1 may be replaced by two resistors with their values adjusted in conjunction with the zener diode (D6) to insure relay closure at a voltage level on the auxiliary terminal 54 which is greater than or equal to 13.6 volts (plus or minus 0.3 volts). The relay coil resistance in the circuit of FIG. 6 is 155 ohms.

the particular values for the various components of the circuit of FIG. 6 are set forth below.

TABLE 2

| COMPONENT | VALUE | COMPONENT | VALUE |
|---|---|---|---|
| R1 | 680 Ohms | C1 | 0.1 μF |
| R2 | 100 Ohms | C2 | 0.1 μF |
| R3 | 180 Ohms | C3 | 10 μF, 16 Volts |
| R4 | 22 Ohms | C4 | 0.1 μF |
| R5 | 1K Ohms | C5 | 0.1 μF |
| R6 | 1M Ohms | C6 | 0.1 μF |
| R7 | 1M Ohms | C7 | 4.7 μF, 16 Volts |
| R8 | 47K Ohms | C8 | 1.0 μF, 16 Volts |
| R10 | 1M Ohms | C9 | 0.1 μF |
| R11 | 10K Ohms | C10 | 1.0 μF, 16 Volts |
| R12 | 47K Ohms | C11 | 0.1 μF |
| R13 | 4K7 Ohms | D1 | 18 Volts ZENER OR V18ZA3 MOV |
| R14 | 3M3 Ohms | D2 | 1N4004 |
| R15 | 3M3 Ohms | D3 | 1N914 |
| R16 | 1K8 Ohms | D4 | 1N914 |
| R17 | 10K Ohms | D5 | 1N914 |
| R18 | 3K3 Ohms | D6 | 3V3 ZENER |
| R19 | 3M3 Ohms | D7 | LED |
| R20 | 47K Ohms | D8 | 1N914 |
| R21 | 330K Ohms | IC1A | ¼ CA324 |
| R22 | 3M3 Ohms | IC1B | ¼ CA324 |
| R23 | 0.02 18 Watts | IC1C | ¼ CA324 |
| R24 | 330 Ohms | IC1D | ¼ CA324 |

TABLE 2-continued

| COMPONENT | VALUE | COMPONENT | VALUE |
|---|---|---|---|
| | | T1 | BC177 |
| | | T2 | BD139 |

Figure 7:
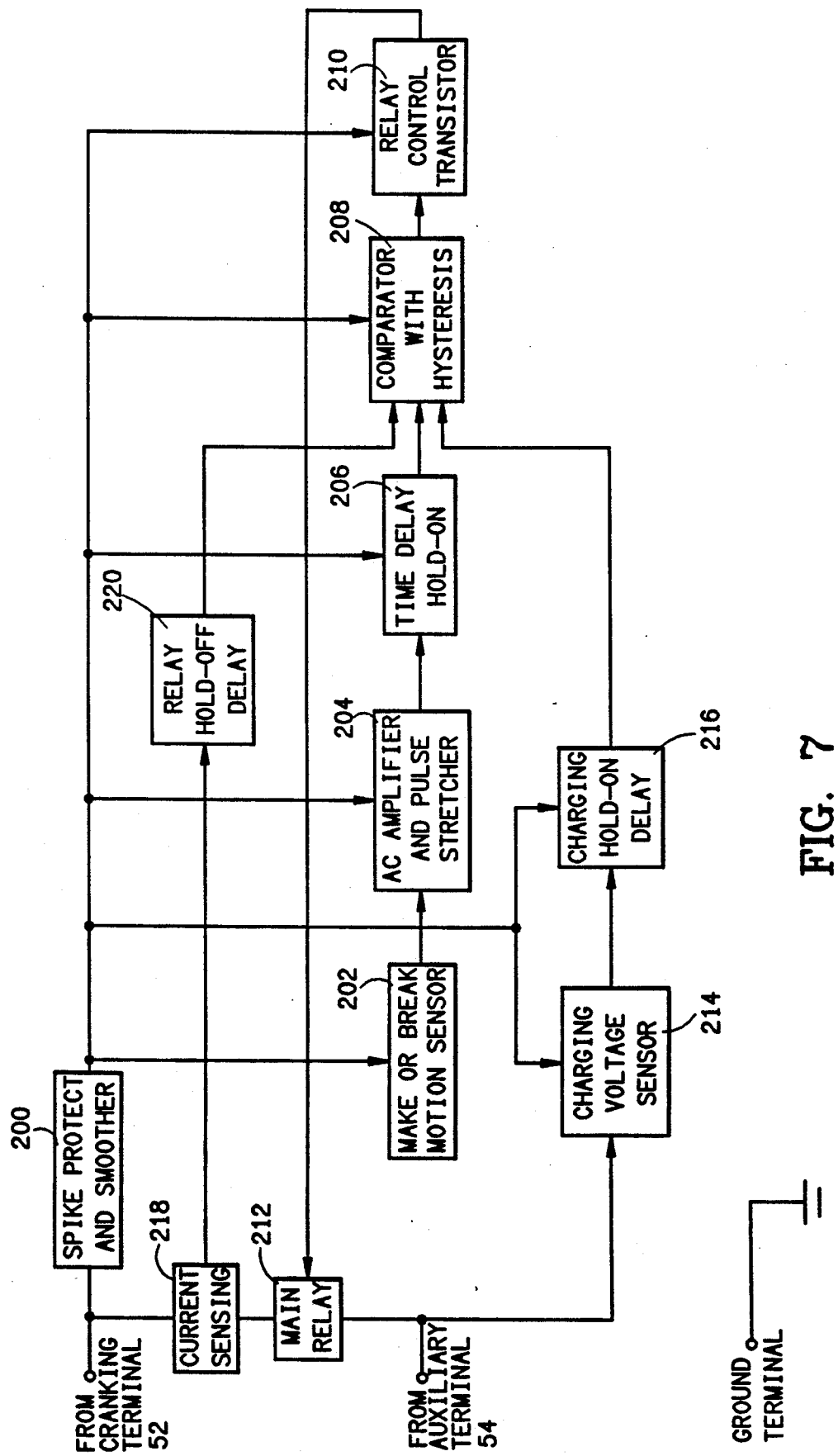
FIG. 7 is a block diagram of another preferred embodiment of a control circuit for operating the switch between the positive battery terminals of the system illustrated in FIG. 4.

FIG. 7 illustrates a block diagram of another control circuit which can be substituted for the circuit 100 of FIG. 4, in controlling the switch 116 between terminals 52 and 54. The circuit of FIG. 7 is similar to the one discussed in FIG. 5, in that it uses the same method of sensing when the auxiliary voltage at terminal 54 exceeds a level such as 13.5 volts for closing the main control relay and, thereby, closing switch 116, to connect the auxiliary terminal 54, and the cranking terminal 52 for charging of the cranking battery cells. However, instead of the electrical load sensing used in the circuit of FIG. 5 to detect when the engine is to be started, the circuit of FIG. 7 closes the main relay in response to a momentary change in an electrical contact of a sensor switch, such as a temporary change from open to closed or from closed to open. This circuit also incorporates a hold on delay time, after the sensor switch has stopped detecting momentary changes to maintain electrical contact between terminals 52 and 54 for a delay time typically on the order of about 30 seconds.

The sensor contacts used for operation of this circuit can be sensitive to physical conditions such vibration, tilt, acceleration, or any other motion of the vehicle such as that resulting from an operator getting into the vehicle or shutting the door, or moving within the vehicle. Sensors which may be used with this circuit include small simple or multiple or compound pendulums, light springs, or a ball or drop of mercury rolling in a hollow dish having a grid of inter-digital contacts that are made as the ball or drop rolls across them.

Referring particularly to FIG. 7, it is noted that power to operate the circuit is supplied from the cranking terminal 52, and is transmitted through a spike protector and smoother 200 wherein the signal is smoothed and spike protection is provided to the circuit. A make or break motion sensor 202, comprised of sensor elements such as those described above, is configured such that if its switch changes from make to break, or vice-versa, a voltage pulse is generated therein. This pulse is transmitted to an AC amplifier and pulse stretcher 204, where the pulse is amplified and stretched. The signal from the block 204 is transmitted to a time delay hold-on circuit 206, which further amplifies and stretches the signal so as to be large enough and long enough to produce a voltage output that is held for about 30 seconds. This voltage is supplied to a comparator 208, which detects the presence of the voltage and passes a signal to a relay control transistor 210 that then causes the main relay 212 to close the switch 116 of FIG. 4. Because of the time delay hold-on circuit 206, the main relay 212 will be closed for about 30 seconds.

After cranking, and during engine operation, if the charging voltage applied to the auxiliary terminal 54 by the alternator exceeds a preset voltage level such as 13.6 volts, then a charging voltage sensor 214 will detect that high voltage level, and will cause an output voltage to be generated and communicated to a charging hold-on delay 216. The charging hold-on delay circuit 216 produces an output signal which is communicated into the comparator 208 and is held for a period of about 10 seconds by the charging hold-on delay circuit. This signal is fed through the comparator 208 to the relay control transistor 210, causing the main relay 212 to close and thereby close the switch 116 of FIG. 4. This condition allows charging to occur on both the auxiliary and cranking portions of the battery.

The reason that the charging hold-on delay circuit 216 is provided is that, if the cranking battery voltage on terminal 52 were low, closing the main relay 212 would cause a corresponding drop in voltage at the auxiliary terminal 54, which drop would likely be well below the selected minimum voltage, and would result in the system immediately opening the main relay 212 and preventing charging. However, by the charging hold-on delay circuit 216 holding the relay 212 closed for 10 seconds, charging is permitted to occur. This cycle will repeat when the main relay 212 opens, subject to over-ride by other parts of the circuit.

If, during cranking, voltage at the cranking terminal falls significant below the voltage at the auxiliary terminal 54, electrical current will be drawn from the auxiliary terminal 54 to the cranking terminal 52, lowering the voltage at the auxiliary terminal 54. This current flow between terminals 54 and 52 is sensed by a current sensing circuit 218, which sends a signal to operate a hold-off delay circuit 220. Delay circuit 220 provides a signal to comparator 208 which is sufficiently large to over-ride the influence of other parts of the circuit by causing comparator 208 to transmit a signal to the relay control transistor 210 that causes the main relay 212 to stay open for 10 seconds and, accordingly, to maintain the terminals 52 and 54 in electrically separate condition for a period of 10 seconds. If appropriate, this cycle will repeat.

Figure 8:
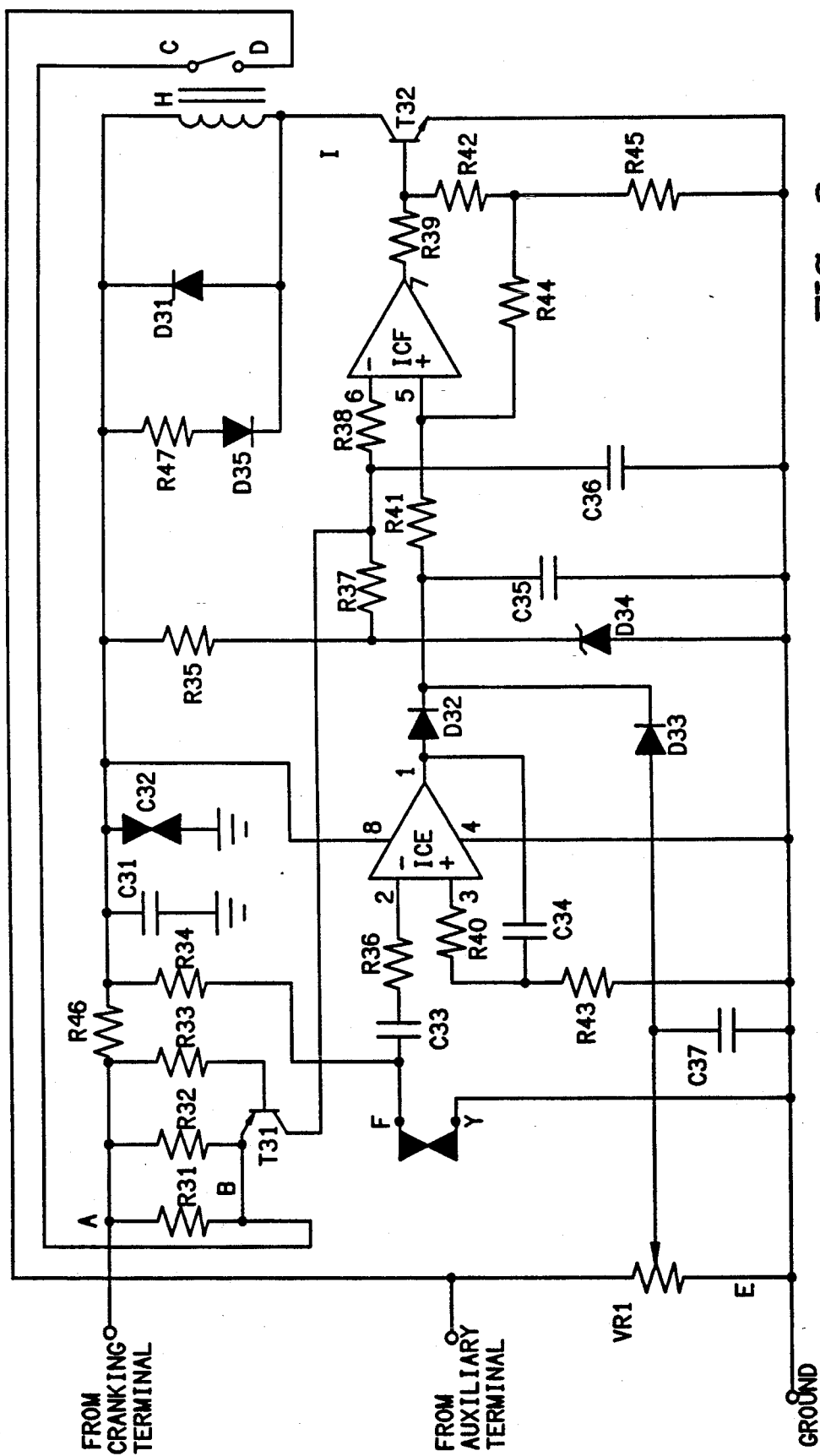
FIG. 8 is a detailed electrical schematic diagram of the control circuit of FIG. 7.

FIG. 8 illustrates one presently preferred embodiment of the circuit described in FIG. 7. The circuit of FIG. 8 corresponds both in component organization and in function to the circuit described in FIG. 7. An understanding of the relationship between the elements of FIG. 7, as identified in the blocks, and the corresponding elements of FIG. 8 can be achieved by reference to table 3 below.

TABLE 3

| COMPONENTS OF THE CIRCUIT OF FIG. 7 | CORRESPONDING COMPONENTS IN THE CIRCUIT OF FIG. 8 |
| --- | --- |
| Spike protector and smoother 200 | R46, C31 and C32 |
| Current sensing circuit 218 | R31, T31, R32, R33 |
| Main relay 212 | C-D |
| Make or break sensor 202 | FY, R34 |
| AC amplifier with pulse stretching 204 | C33, C34, R40, R43, ICE (PINS 1, 2 and 3) |
| Time delay hold-on 206 | D32, C35, R41, R44, R42 and R45 |
| Comparator with hysteresis 208 | R35, D34, R41, R44, R42, R45 and ICF (PINS 5, 6 and 7) |
| Relay control transistor 210 | T32, D31 |
| Relay hold-off delay 220 | C36, R37, R35, D34, ICF (PINS 5, 6 and 7) |
| Charging voltage sensor 214 | VR1, D33, R35, D34, ICF (PINS 5, 6 and 7) |
| Charging hold-on delay 216 | D33, C35, R41, R44, R42, R45, ICF (PINS 5, 6 and 7) |

The component values for the various elements of the circuit of FIG. 8 are set forth in the table 4 below.

TABLE 4

| COMPONENT | VALUE | COMPONENT | VALUE |
| --- | --- | --- | --- |
| R31 | 0.02 Ohms 18 Watts | C31 | 0.1 μF |
| R32 | 100 Ohms | C32 | 22 μF, 16 Volts, or V18ZA3 MOV |
| R33 | 180 Ohms | C33 | 0.1 μF |
| R34 | 10K Ohms | C34 | 0.1 μF |
| R35 | 3K3 Ohms | C35 | 3.3 μF, 16 Volts |
| R36 | 47K Ohms | C36 | 1.0 μF, 16 Volts |
| R37 | 2M2 Ohms | C37 | 0.2 μF |
| R38 | 47K Ohms | D31 | 1N4004 |
| R39 | 1K8 Ohms | D32 | 1N914 |
| R40 | 47K Ohms | D33 | 1N914 |
| R41 | 2M2 Ohms | D34 | 3V3 ZENER |
| R42 | 10K Ohms | D35 | LED |
| R43 | 1M Ohms | T31 | BC177 |
| R44 | 2M2 Ohms | T32 | BD139 |
| R45 | 2K2 Ohms | ICE | ½ LM548 |
| R46 | 1.5 μF | ICF | ½ LM548 |
| R47 | 1K Ohms | FY | MAKE/BREAK CONTACTS |
| VR1 | 10K Ohms | | |

Figure 9:
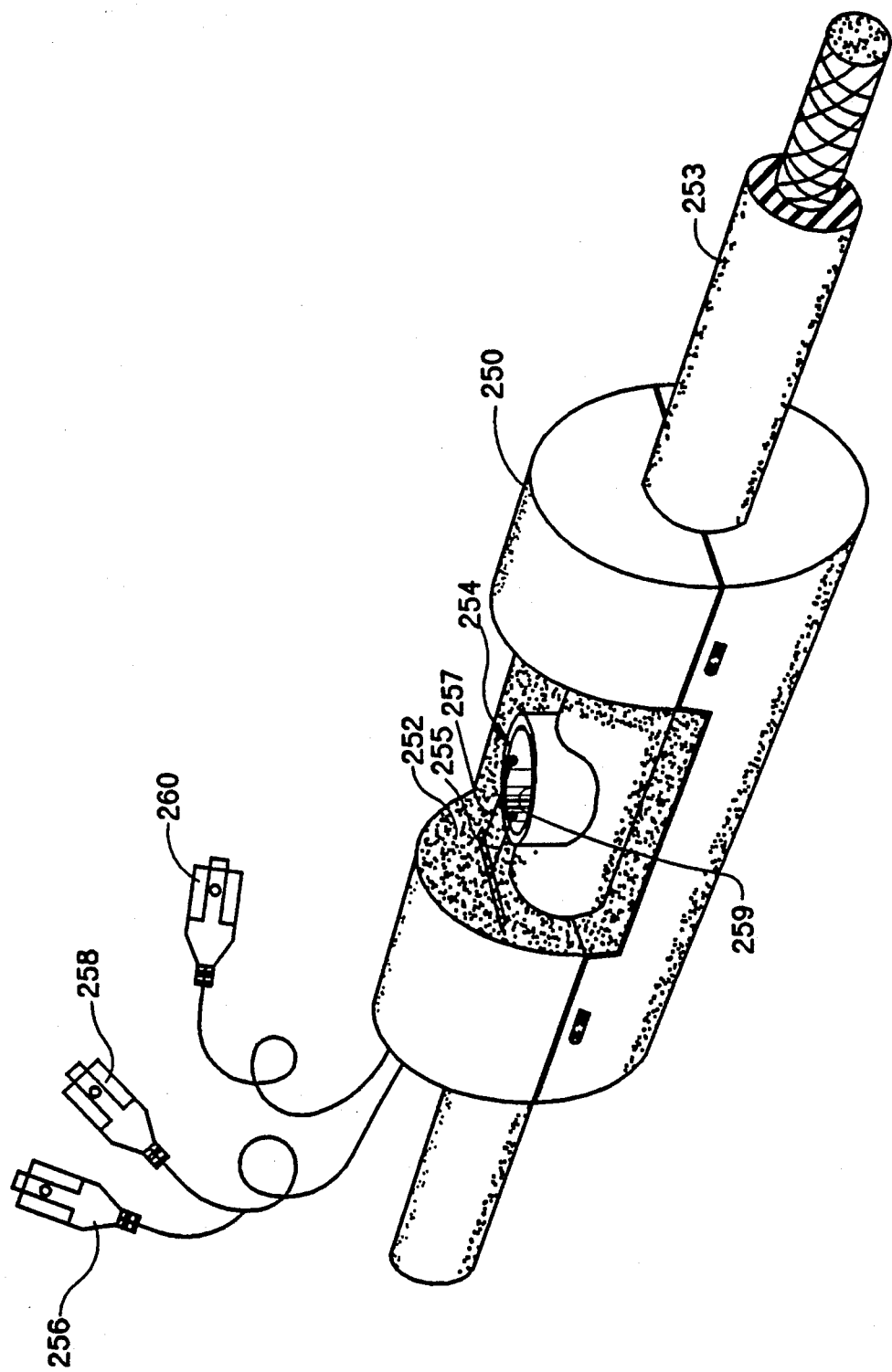
FIG. 9 is a perspective view of one preferred embodiment of a mechanical sensor housing for use as part of the power distribution system of the present invention.

The battery configurations and circuit configurations described above are, in one preferred embodiment, intended to be secured within a single housing that can be mounted, for example, in a battery storage location within the engine compartment of an automobile. FIG. 9 illustrates another preferred embodiment of a sensor and switching circuit configuration for use in the system, wherein the switching circuit and a sensor are secured separate from the battery and, in the illustrated embodiment, secured upon a cable in the engine compartment.

More particularly, the switch arrangement illustrated in FIG. 9 comprises a housing 250 which encases a switch circuit. The switch itself is surrounded by an insulator material 252, within the housing. A sensor such as a vibrator 254 includes vibrating members 255 and 257, which respond to movement of the surrounding device by coming into contact with a conductive plate 259 such that current is momentarily communicated from the plate through the members 255 and 257 to a switch configuration such as that illustrated at 110 and 112 in FIG. 4.

Of course, one technically skilled in the art will recognize that any of numerous types of vibrators or other mechanical sensors could be used in the manner illustrated in FIG. 9. The housing 250 can be opened or separated at its center before being applied to a component of the automobile engine. In the illustrated embodiment, the housing is secured by clipping it over an accelerator cable 253, and securing the two sides together so as to maintain its position on that cable.

The accelerator cable 253 was selected since it will likely experience vibration before many of the other components in the engine compartment. This is because the operator will typically place his foot on the accelerator peddle and pump it prior to turning on the starter motor. Such movement of the accelerator peddle will be relayed through the accelerator cable to the sensor 254. A power connector 256 is connected to terminal 52 while another power connector 258 is connected to terminal 54, so that the switch electrically connecting those two terminals can achieve its connection through the connectors 256 and 258. A power connector 260 comprises the connection for supplying power from one of the battery terminals to the switch circuit within housing 250. Accordingly, the connector 260 is preferably connected to the cranking terminal 52 so that the switching circuit in housing 250 may be provided with power even when power is not being provided through the auxiliary terminal 54 as a result of inadvertent discharging of that portion of the battery.

The power distribution system of the present invention comprises a significant improvement in the technology by overcoming the long standing problems associated with the providing of a battery system useful in automobile and similar applications, wherein a high current, rapid discharge power source is desirable for cranking purposes, while a low current, slow discharge power source is desirable for serving automobile auxiliary equipment. The present invention comprises a system wherein both types of power source are made available, preferably in a single battery configuration, and with an electrical circuit arrangement which maximizes efficiency in power distribution from the battery to the engine components, while also providing protection to sensitive auxiliary circuits. The power distribution system can be secured within a single housing in a manner which permits battery installation in a vehicle with virtually negligible change to the vehicle or its wiring system. The system additionally permits the storage of cranking power, even when auxiliary systems such as vehicle lights have been inadvertently left on, and the auxiliary portion of the battery has become discharged. The switching between power sources for purposes of providing cranking power, as well as for system charging, is all accomplished automatically and without operator intervention.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electrical power distribution system, comprising:
   a first electrical line connectable to a first power source and a first electric load for carrying power from said first power source to said first electrical load;
   a second electrical line, electrically separated from the first electrical line and connectable to second power source and a second electrical load for carrying power from said second power source to said second electrical load; and
   means responsive to an external stimulus for electrically connecting the second line to the first line during a time period defined by presence of the external stimulus, so as to carry power form both of the first and second power sources to the first electrical load during said time period, and wherein the first power source comprises a first series of battery cells constructed so as to provide a slow discharge configuration for supplying current to conventional automotive auxiliary equipment, and wherein said second power source comprises a second series of battery cells constructed so as to provide a rapid discharge configuration for supplying current to conventional automotive starter motors.

2. An electrical power distribution system as defined in claim 1, further comprising:
   a control switch; and
   means responsive to the control switch for electrically connecting the second line to the second electrical load so as to carry power from the second power source to said second electrical load during a time period defined by the control switch.

3. An electrical power distribution system as defined in claim 2, wherein the means for electrically connecting the second line to the second electrical load also connects the first line to the second electrical load during said time period defined by the control switch.

4. An electrical power distribution system as defined in claim 1, wherein said system further includes said first and second power sources and said first and second loads, and the first power source comprises a d.c. source having cells that discharge at a rate sufficient for supply of power to conventional automobile electronic auxiliary loads.

5. An electrical power distribution system as defined in claim 4, wherein the first electrical load comprises a load formed of conventional automobile electronic auxilliary equipment.

6. An electrical power distribution system as defined in claim 1, wherein said system further includes said first and second power sources and said first and second loads, and the second power source comprises a d.c. source having cells that discharge at a rate sufficient for supply of power to a conventional automobile starter motor, during cranking of the motor in starting an associated engine.

7. An electrical power distribution system as defined in claim 6, wherein the second electrical load comprises a conventional automobile starter motor.

8. An electrical power distribution system as defined in claim 1, wherein the means for electrically connecting the first line to the second line comprises:
   a switch having a first terminal electrically connected to the first line and a second terminal electrically connected to the second line, such that when the switch is closed, the first and second lines are electrically connected together; and
   a switch control circuit responsive to the external stimulus for closing and opening the switch.

9. An electrical power distribution system as defined in claim 8, wherein the switch control circuit comprises:
   a first relay electrically connected so as to control the opening and closing of the switch;
   a sensor for detecting the external stimulus; and
   a second relay responsive to the sensor and electrically connected to one of the first and second power sources for providing power to the first relay in response to sensor detection of the external stimulus, so that said first relay causes the switch to close, connecting the first and second power sources together.

10. An electrical power distribution system as defined in claim 9, wherein the switch control circuit further comprises timing means electrically connected to one of the first and second relays for causing the first relay to delay opening the switch for a selected time after the external stimulus is no longer detected by the sensor.

11. An electrical power distribution system as defined in claim 1, wherein said electrically connecting means is responsive to a mechanical condition.

12. An electrical power distribution system as defined in claim 11, wherein said electrically connecting means is responsive to mechanical vibration.

13. An electrical power distribution system as defined in claim 11, wherein said electrically connecting means is responsive to noise.

14. An electrical power distribution system as defined in claim 11, wherein said electrically connecting means is responsive to movement of a selected object.

15. An electrical power distribution system as defined in claim 10, wherein said electrically connecting means is responsive to an electrical condition.

16. An electrical power distribution system as defined in claim 10, wherein said electrically connecting means is responsive to a voltage change at a designated location in the power distribution system.

17. An electrical power distribution system as defined in claim 15 wherein said electrically connecting means is responsive to a current flow change in a designated component in the power distribution system.

18. An electrical power distribution system as defined in claim 1, wherein the first line has an electrical resistance of a conventional automobile cable for carrying power from a battery to automobile auxilliary equipment, and wherein the second line has an electrical resistance of a conventional automobile cable for carrying power from a battery to an automobile starter motor.

19. An electrical power distribution system as defined in claim 1, wherein said first and second power sources are chargeable, and wherein said system further comprises:
  means electrically connected to the first electrical line, and electrically connected through the connecting means to the second line when said first and second lines are electrically connected, for charging the first and second power sources;
  means for detecting selected conditions in the electrical power distribution system; and
  means responsive to the detecting means for electrically separating the charging means from the second line following detection of the selected conditions.

20. An electrical power distribution system as defined in claim 19, wherein the charging means comprises a conventional automotive generator.

21. An electrical power distribution system as defined in claim 19, wherein said detecting means detects a voltage level at a specified location in said distribution system that is outside selected limits, and wherein the means for electrically separating the charging means from the second line comprises electronic circuitry electrically connected to the connecting means for causing said connecting means to electrically disconnect the second line from the first line.

22. An electrical power distribution system, comprising:
  a first power source for powering electrical loads of the type created by conventional automotive auxiliary equipment;
  a second power source for powering electrical loads of the type created by conventional automotive starter motors;
  a first electrical conductor connected to said first power source and a second electrical load for carrying power from the first power source to the first electrical load;
  a second electrical conductor connected to said second power source and a second electrical load for carrying power from the second power source to the second electrical load; and
  an electrical switching system electrically connected between the first and second conductors and responsive to detection of the presence or absence of a selected physical condition for electrically connecting the first conductor to the second conductor during a time period defined by detection of the presence of said selected physical condition, so that power is distributed from both of the first and second power sources to the first electrical load during said time period, and wherein the first power source comprises a first series of battery cells constructed so as to provide a slow discharge configuration for supplying current to conventional automotive auxiliary equipment, and wherein said second power source comprises a second series of battery cells constructed so as to provide a rapid discharge configuration for supplying current to conventional automotive starter motors.

23. An electrical power distribution system, comprising:
  a first power source for powering electrical loads of the type created by conventional automotive auxiliary equipment;
  a second power source for powering electrical loads of the type created by conventional automotive starter motors;
  a first electrical conductor connected to said first power source and a first electrical load for carrying power from the first power source to the first electrical load;
  a second electrical conductor connected to said second power source and a second electrical load for carrying power form the second power source to the second electrical load; and
  an electrical switching system electrically connected between the first and second conductors and responsive to detection of the presence or absence of a selected physical condition for electrically connecting the first conductor to the second conductor during a time period defined by detection of the presence of said physical condition, so that power is distributed from both of the first and second power sources to the first electrical load during said time period, wherein the first power source comprises a first series of battery cells constructed so as to provide a slow discharge configuration for supplying current to conventional automotive auxiliary equipment, and wherein said second power source comprises a second series of battery cells constructed so as to provide a rapid discharge configuration for supplying current to conventional automotive starter motors.

24. An electrical power distribution system as defined in claim 23, wherein the first and second series of battery cells form two sets of cells arranged in parallel so as to provide dual current variations at their positive terminals.

25. An electrical power distribution system as defined in claim 24, further comprising a housing within which the first and second power sources and the electrical switching system are all secured.

26. An electrical power distribution system as defined in claim 22, further comprising:
  a control switch; and an electrical circuit responsive to the control switch for electrically connecting the second conductor to the second electrical load so as to carry power from the second power source to said second electrical load during a time period defined by the control switch.

27. An electrical power distribution system as defined in claim 26, wherein the electrical switching system further comprises:
means for detecting a selected condition in the electrical power distribution system; and
means responsive to the detecting means for electrically separating the first and second conductors for a selected period of time after detection of the selected condition.

28. An electrical power distribution system as defined in claim 27, wherein the detecting means comprises an electronic circuit, and wherein the selected condition comprises a voltage level at a specified location in the distribution system that is outside a selected voltage limit.

29. An electrical power distribution system as defined in claim 27, wherein the detecting means comprises an electronic circuit, and wherein the selected condition comprises an electrical current level at a specified location in the distribution system that is outside a selected current limit.

30. A method of distributing power from first and second power sources to firs and second electrical loads in an electrical system, comprising the steps of:
connecting a first electrical line to the first power source and the first electrical load;
connecting a second electrical line to the second power source and the second electrical load;
detecting the presence of a selected physical condition; and
electrically connecting the second line to the first line during a time period defined by presence of the selected physical condition, so as to carry power from both of the first and second power sources to the first electrical load during said time period, and wherein the first power source comprises a first series of battery cells constructed so as to provide a slow discharge configuration for supplying current to conventional automotive auxiliary equipment, and wherein said second power source comprises a second series of battery cells constructed so as to provide a rapid discharge configuration for supplying current to conventional automotive starter motors.

31. A method of distributing power as defined in claim 30, further comprising the steps of:
detecting operation of a control switch; and
electrically connecting the second line to the second electrical load so as to carry power from the second power source to said second electrical load during a time period defined by the control switch.

32. A method of distributing power as define din claim 30, further comprising the steps of:
detecting the absence of the selected physical condition;
continuing to maintain the electrical connection between the first and second lines for a selected period of time after detecting the absence of the selected physical condition; and
electrically separating the first and second lines after expiration of the selected period of time.

33. A method of distributing power as defined in claim 30, further comprising the steps of:
electrically separating the first and second lines in response to detection of the selected condition.

34. A method of distributing power as defined in claim 33, wherein the step of detecting a selected condition comprises the step of detecting a voltage level that is outside selected voltage limits in a specified location in the electrical system.

35. A method of distributing power as defined in claim 33, wherein the step of detecting a selected condition comprises the step of detecting an electrical current level that is outside selected electrical current limits in a specified location in the electrical system.

36. An electrical power distribution system as defined in claim 9, wherein said system is operably associated with an internal combustion engine and at least one of said power sources has a voltage associated therewith, and said first relay causes the switch to close when said engine is operating and the voltage of said power source exceeds a predetermined voltage.

37. An electrical power distribution system as defined in claim 9, wherein said system is operably associated with an internal combustion engine and at least one of said power sources has a voltage associated therewith, and said first relay causes the switch to open when said engine is operating and the voltage of said power source is less than a predetermined voltage.

38. A method of distributing power as defined in claim 33, wherein each of the power sources has a voltage associated therewith, and said lines are electrically separated when the difference between the voltages exceeds a predetermined amount.

* * * * *